(12) United States Patent
Hayakawa

(10) Patent No.: US 11,084,202 B2
(45) Date of Patent: Aug. 10, 2021

(54) HEATING APPARATUS AND HEATING METHOD FOR PREFORMS, ASEPTIC BLOW MOLDING MACHINE AND ASEPTIC BLOW MOLDING METHOD

(71) Applicant: Dai Nippon Printing Co., Ltd., Tokyo (JP)

(72) Inventor: Atsushi Hayakawa, Tokyo (JP)

(73) Assignee: Dai Nippon Printing Co., Ltd., Tokyo (JP)

(\*) Notice: Subject to any disclaimer, the term of this patent is extended or adjusted under 35 U.S.C. 154(b) by 160 days.

(21) Appl. No.: 16/336,314

(22) PCT Filed: Sep. 20, 2017

(86) PCT No.: PCT/JP2017/033957
§ 371 (c)(1),
(2) Date: Mar. 25, 2019

(87) PCT Pub. No.: WO2018/061946
PCT Pub. Date: Apr. 5, 2018

(65) Prior Publication Data
US 2019/0283305 A1    Sep. 19, 2019

(30) Foreign Application Priority Data

Sep. 28, 2016 (JP) .............................. JP2016-189313
Oct. 18, 2016 (JP) .............................. JP2016-204671

(51) Int. Cl.
*B29C 49/36* (2006.01)
*B29C 49/46* (2006.01)
(Continued)

(52) U.S. Cl.
CPC .............. *B29C 49/46* (2013.01); *B29C 49/36* (2013.01); *B29C 49/42* (2013.01); *B29C 49/6409* (2013.01); *B29C 2049/4679* (2013.01)

(58) Field of Classification Search
CPC . B29C 49/36; B29C 49/46; B29C 2049/4679; B29C 2049/4697; B29C 49/6409
See application file for complete search history.

(56) References Cited

U.S. PATENT DOCUMENTS 4,836,971 A * 6/1989 Denis .................... B29C 49/649
264/342 R
8,662,872 B2 * 3/2014 Quetel .................. B29B 13/025
425/73
(Continued)

FOREIGN PATENT DOCUMENTS

DE   102013108212 A1 * 2/2015 ............. B29C 49/46
EP      3 069 847 A1    9/2016
(Continued)

OTHER PUBLICATIONS

Partial machine translation of DE 10 2013 108 212 A1 dated Feb. 2015 obtained from the espace website. (Year: 2015).*
(Continued)

*Primary Examiner* — Robert B Davis
(74) *Attorney, Agent, or Firm* — Burr & Brown, PLLC

(57) ABSTRACT

A heating apparatus and heating method for preforms that heat a sterilized preform to a temperature at which the preform can be molded into a bottle in an aseptic atmosphere. Additionally, an aseptic blow molding machine and an aseptic blow molding method that can mold the sterilized preform into a bottle in the aseptic atmosphere, and can take out the bottle from a bottle molding machine in a state where the sterility of the bottle is maintained. A chamber covering a heating unit that heats the preform is provided, and a sterilizing apparatus that sterilizes the inside of the chamber, and an aseptic air supplying apparatus for maintaining the sterility are provided. Additionally, a chamber covering a molding unit that molds the preform into a bottle is provided, a sterilizing apparatus that sterilizes the inside of the (Continued)

chamber, and an aseptic air supplying apparatus for maintaining the sterility are provided.

16 Claims, 7 Drawing Sheets

(51) Int. Cl.
  *B29C 49/64* (2006.01)
  *B29C 49/42* (2006.01)

(56) References Cited

U.S. PATENT DOCUMENTS

| | | | |
|---|---|---|---|
| 9,321,621 B2 | 4/2016 | Kitano et al. | |
| 9,345,801 B2 | 5/2016 | Martini et al. | |
| 2006/0157896 A1* | 7/2006 | Lee | B29C 49/6409 264/345 |
| 2008/0152538 A1 | 6/2008 | Quetel et al. | |
| 2009/0317506 A1 | 12/2009 | Adriansens | |
| 2010/0170867 A1* | 7/2010 | Hayakawa | B67C 7/0073 215/379 |
| 2010/0272844 A1 | 10/2010 | Dordoni | |
| 2011/0037187 A1 | 2/2011 | Winzinger et al. | |
| 2011/0133369 A1 | 6/2011 | Martini et al. | |
| 2012/0070340 A1 | 3/2012 | Voth | |
| 2012/0164258 A1 | 6/2012 | Dordoni | |
| 2012/0286459 A1 | 11/2012 | Neubauer et al. | |
| 2012/0288406 A1 | 11/2012 | Iwashita et al. | |
| 2012/0326359 A1 | 12/2012 | Neubauer et al. | |
| 2013/0040009 A1 | 2/2013 | Laumer | |
| 2014/0110876 A1 | 4/2014 | Braun et al. | |
| 2014/0144105 A1 | 5/2014 | Hayakawa et al. | |
| 2015/0069670 A1 | 3/2015 | Hoellriegl et al. | |
| 2015/0151480 A1* | 6/2015 | Brunner | B29C 49/28 425/526 |
| 2016/0207245 A1 | 7/2016 | Lewin et al. | |
| 2016/0263269 A1 | 9/2016 | Hayakawa et al. | |
| 2016/0325482 A1 | 11/2016 | Hayakawa et al. | |
| 2018/0001541 A1 | 1/2018 | Hayakawa | |
| 2018/0009646 A1 | 1/2018 | Hayakawa et al. | |

FOREIGN PATENT DOCUMENTS

| | | | | |
|---|---|---|---|---|
| JP | 2008-183899 A1 | 8/2008 | | |
| JP | 2010-507503 A1 | 3/2010 | | |
| JP | 2010-264753 A1 | 11/2010 | | |
| JP | 2011-051337 A1 | 3/2011 | | |
| JP | 2011-147673 A | 8/2011 | | |
| JP | 2012-500134 A1 | 1/2012 | | |
| JP | 2012-236413 A1 | 12/2012 | | |
| JP | 2013-010352 A1 | 1/2013 | | |
| JP | 2013-035562 A1 | 2/2013 | | |
| JP | 2013-504456 A1 | 2/2013 | | |
| JP | 2013-056530 A1 | 3/2013 | | |
| JP | 2014-065301 A1 | 4/2014 | | |
| JP | 2014-094561 A1 | 5/2014 | | |
| JP | 2015-116814 A1 | 6/2015 | | |
| JP | 2015-171812 A1 | 10/2015 | | |
| JP | 2016-120597 A1 | 7/2016 | | |
| JP | 2016-531775 A1 | 10/2016 | | |
| WO | 2011/148953 A1 | 12/2011 | | |
| WO | 2015/024637 A1 | 2/2015 | | |
| WO | WO-2015072506 A1 * | 5/2015 | | A61L 2/06 |
| WO | 2016/143772 A1 | 9/2016 | | |

OTHER PUBLICATIONS

Partial Supplementary European Search Report (Application No. 17855901.9) dated Feb. 26, 2020.
International Search Report and Written Opinion (Application No. PCT/JP2017/033957) dated Nov. 7, 2017.

* cited by examiner

HEATING

BLOW MOLDING

HEATING APPARATUS AND HEATING METHOD FOR PREFORMS, ASEPTIC BLOW MOLDING MACHINE AND ASEPTIC BLOW MOLDING METHOD

TECHNICAL FIELD

The present invention relates to a heating apparatus and a heating method for preforms for sterilizing a preform, and heating the sterilized preform in an aseptic atmosphere. Additionally, the present invention relates to an aseptic blow molding machine and an aseptic blow molding method that mold the heated preform into a bottle in the aseptic atmosphere.

BACKGROUND ART

Conventionally, a sterilizing method is proposed that applies a disinfectant to a preform while continuously conveying the preform, directly introduces the preform into a heating furnace, heats the preform to a temperature for molding the preform into a container in the heating furnace, and simultaneously performs drying and activation of the disinfectant applied to the preform by this heating (Patent Literature 1). In this case, the preform is sterilized in the heating furnace since the disinfectant is activated in the heating furnace. However, there is no description about a countermeasure against the possibility that bacteria, etc. existing in the heating furnace adhere to the preform after the activation of the disinfectant is completed. Additionally, there is no description about a method or an apparatus for maintaining the sterility when molding the preform.

Additionally, a drink filling method is proposed that sprays mist or gas of a hydrogen peroxide solution on a preform, further heats the preform to a molding temperature, molds the preform that reached the molding temperature into a bottle within a blow molding die that is similarly continuously conveyed, removes the bottle from the blow molding die, and thereafter fills the bottle with a drink and seals the bottle with a lid (Patent Literatures 2 and 3). In these Patent Literatures, there is a description of covering a heating unit and a molding unit, sterilizing the inside of a covered chamber before the operation of the heating unit and the molding unit, and supplying an aseptic air into the chamber at the time of the operation. However, there is no sufficient description about securing and maintaining the sterility in the heating unit that heats the preform. Additionally, there is no description about securing and maintaining the sterility in the molding unit that molds the preform into a bottle.

On the other hand, a method is also proposed that performs ultraviolet irradiation in the heating unit that heats the preform, so as to prevent contamination of the preform in the heating unit (Patent Literature 4).

Further, a method and an apparatus are proposed that sterilize the inner surface of a mold that molds a preform into a bottle (Patent Literature 5). Additionally, it is also proposed to provide a mold, a blow nozzle, and an extension rod in a clean room (Patent Literature 6). However, there is a possibility that sterilization of the mold inner surface is complicated, and durability is insufficient since a bellows is used for maintaining the sterility of the extension rod.

Additionally, an apparatus and the like are proposed that set a blow nozzle and a mold of a molding machine in an aseptic atmosphere, and set the other in a non-aseptic atmosphere, sterilize a chamber in which an extension rod in the non-aseptic atmosphere is moved, so as to secure the sterility of the extension rod (Patent Literatures 7 and 8). However, a sterilization mechanism for the extension rod is complicated, and an opening of the molded bottle is directed downward, and it is difficult to direct the opening upward. Additionally, when the opening of the bottle is directed downward, a conveying apparatus becomes complicated, and it is necessary to provide the equipment for reversing the bottle.

CITATION LIST

Patent Literature

Patent Literature 1: Japanese Patent Laid-Open No. 2008-183899
Patent Literature 2: Japanese Patent Laid-Open No. 2013-35562
Patent Literature 3: Japanese Patent Laid-Open No. 2015-116814
Patent Literature 4: Japanese Patent Laid-Open No. 2010-507503
Patent Literature 5: Japanese Patent Laid-Open No. 2011-51337
Patent Literature 6: Japanese Patent Laid-Open No. 2012-500134
Patent Literature 7: Japanese Patent Laid-Open No. 2010-264753
Patent Literature 8: Japanese Patent Laid-Open No. 2013-504456

SUMMARY OF INVENTION

Technical Problem

Conventionally, an aseptic filling machine for bottles molds a preform into a bottle, and sterilizes the molded bottle. However, since a large quantity of disinfectant is required, and the apparatus becomes excessively large, an aseptic filling machine that performs sterilization at the stage of a preform is becoming widely used. However, it is necessary to convey a bottle while maintaining the sterility until the molded bottle is filled with a content, after the sterilization is performed at the stage of the preform, and the preform is molded into the bottle. Especially, it is important to secure the sterility in a heating process that heats the sterilized preform for molding the preform into a bottle, and in a molding step that molds the preform into a bottle, and this has been a problem.

Even if the bacteria, etc. adhering to the internal and external surfaces of a preform are sterilized, in order to mold the preform into a bottle, the preform must be heated to the temperature at which molding can be performed. Conventionally, in order to prevent a foreign matter from being mixed into the inside of the preform in this process, heating was performed with the opening of the preform directed downward, and the subsequent blow molding of the bottle was also performed with the opening directed downward. However, the bottle must be reversed in order to direct the opening upward, so as to fill the bottle with content after the bottle is molded. In order to avoid this, heating and molding are performed with the opening of the preform directed upward. Whether the opening of the preform is directed downward or upward, there is a high possibility that not only a foreign matter but also bacteria, etc. that cannot be viewed exist in the heating unit of the preform, and there is a possibility that bacteria, etc. may adhere to the internal and external surfaces of the preform after sterilization in the heating unit and the molding part. In the case where the bacteria, etc. adhere to the inside, the sterility of the content is lost, and in the case where the bacteria, etc. adhere to the outside, when the adhering bacteria, etc. fall in a filling unit, the bacteria, etc. will invade into the filling unit. As a result, the sterility of the filling unit is lost, the bacteria, etc. will invade into the inside of a bottle, and the sterility of a product will be lost.

In Patent Literature 2, there is a description about integrally forming the heating unit that heats the sterilized preform and the molding unit that molds the preform into a bottle after heating, sterilizing the molding unit before the operation, and maintaining the sterility of the molding unit at the time of operation. However, there isn't sufficient description about the sterilization of the heating unit before the operation, and maintaining the sterility of the heating unit at the time of operation. Additionally, in Patent Literature 4, there is a description that an atmosphere is also sterilized by filtering the circulating air in the heating unit at the time of operation, and by performing ultraviolet irradiation to the circulating air. However, there is no description about the sterilization of the heating unit before the operation. Patent Literature 4 does not prevent contamination by bacteria, etc. of the preform in the heating unit, but it is the proposal of sterilizing bacteria, etc. that contaminate the preform in the heating unit during the operation. This cannot fully sterilize the bacteria, etc. that exist in the heating unit before the operation.

As described above, a heating apparatus and a heating method for preforms are demanded that maintain the sterility of the sterilized preform, and heat to the temperature at which the preform can be molded into a bottle.

The molding machine and the molding method that mold the sterilized preform into a bottle are proposed by Patent Literature 5, Patent Literature 6, Patent Literature 7, and Patent Literature 8. However, because of the reasons described in Background Art, all of these are insufficient as a technology for securing the sterility of the molding unit. That is, an aseptic blow molding machine and an aseptic blow molding method are desired that can mold the sterilized preform in an aseptic atmosphere, and takes out a bottle from the molding machine in a state where the sterility of the bottle is maintained.

The present invention aims at providing a heating apparatus and a heating method for preforms that can heat a sterilized preform in an aseptic atmosphere, and convey the preform to a molding unit that molds the preform into a bottle while maintaining the sterility of the preform, and providing an aseptic blow molding machine and an aseptic blow molding method that can mold a preform into an aseptic bottle while maintaining the sterility of the heated preform.

Solution to Problem

A heating apparatus for preforms according to the present invention is a heating apparatus for preforms, the heating apparatus including at least a heating unit that heats a preform to a temperature for blow molding of the preform into a bottle, and a driving unit that drives the heating unit, wherein the heating unit includes at least a heater, a reflector, a spindle, an endless chain, and a pulley for rotating the endless chain, the heating unit is covered by a heating unit chamber, and a sterilizing apparatus that sterilizes an inside and an inner surface of the heating unit chamber is provided.

Additionally, in the heating apparatus for preforms according to the present invention, it is preferable that the heating unit chamber holds the heating unit, and covers the heating unit from the open air.

Additionally, in the heating apparatus for preforms according to the present invention, it is preferable that an aseptic air supplying apparatus that supplies an aseptic air into the heating unit chamber is provided.

Additionally, in the heating apparatus for preforms according to the present invention, it is preferable that the aseptic air supplying apparatus is provided so as to supply the aseptic air from a lower part of the heating unit chamber.

Additionally, in the heating apparatus for preforms according to the present invention, it is preferable that an aseptic air heating apparatus is provided in the aseptic air supplying apparatus.

Additionally, in the heating apparatus for preforms according to the present invention, it is preferable that a disinfectant gas generator that generates a gas of a disinfectant is provided in the sterilizing apparatus.

A heating method for preforms according to the present invention is a heating method for preforms using a heating apparatus for preforms, the heating apparatus including at least a heating unit that heats a preform to a temperature for blow molding of the preform into a bottle, and a driving unit that drives the heating unit, wherein the heating unit includes at least a heater, a reflector, a spindle, an endless chain, and a pulley for rotating the endless chain, the heating unit is covered by a heating unit chamber, and a sterilized preform is heated by making the inside of the heating unit chamber into an aseptic atmosphere Additionally, in the heating method for preforms according to the present invention, it is preferable that the heating unit chamber is sterilized by spraying a gas or mist of a disinfectant or a mixture of these into the heating unit chamber.

Additionally, in the heating method for preforms according to the present invention, it is preferable that an aseptic air is supplied into the heating unit chamber, and the inside of the heating unit chamber is held in the aseptic atmosphere.

An aseptic blow molding machine according to the present invention is an aseptic blow molding machine including at least a molding unit that performs blow molding of a preform into a bottle, and a driving unit that drives the molding unit, wherein the molding unit includes at least a mold, a blow nozzle, a valve block, and an extension rod, the molding unit is covered by a molding unit chamber, and a sterilizing apparatus that sterilizes an inside and an inner surface of the molding unit chamber is provided.

Additionally, in the aseptic blow molding machine according to the present invention, it is preferable that the molding unit chamber consists of a movable unit that holds the molding unit and covers the driving unit, and a fixed unit that covers the molding unit from an outside air.

Additionally, in the aseptic blow molding machine according to the present invention, it is preferable that a liquid seal apparatus that seals the movable unit and the fixed unit is provided.

Additionally, in the aseptic blow molding machine according to the present invention, it is preferable that a high pressure air supplying apparatus is provided that is in the molding unit chamber, and that supplies a high pressure air to the valve block from an outside of the molding unit chamber through an inside of a rotating tube.

Additionally, in the aseptic blow molding machine according to the present invention, it is preferable that an aseptic air supplying apparatus that supplies an aseptic air to the molding unit chamber is provided.

Additionally, in the aseptic blow molding machine according to the present invention, it is preferable that the aseptic air supplying apparatus is provided on the molding unit chamber.

Additionally, in the aseptic blow molding machine according to the present invention, it is preferable that an aseptic air heating apparatus is provided in the aseptic air supplying apparatus.

Additionally, in the aseptic blow molding machine according to the present invention, it is preferable that a disinfectant gas generator that generates a gas of a disinfectant is provided in the sterilizing apparatus.

An aseptic blow molding method according to the present invention is an aseptic blow molding method using a blow molding machine including at least a molding unit that performs blow molding of a preform into a bottle, and a driving unit that drives the molding unit, wherein the molding unit includes at least a mold, a blow nozzle, a valve block, and an extension rod, the molding unit is covered by a molding unit chamber, and a sterilized preform is molded into the bottle by making the inside of the molding unit chamber into an aseptic atmosphere.

Additionally, in the aseptic blow molding method according to the present invention, it is preferable that the molding unit chamber is sterilized by spraying a gas or mist of a disinfectant or a mixture of these into the molding unit chamber.

Additionally, in the aseptic blow molding method according to the present invention, it is preferable that an aseptic air is supplied into the molding unit chamber, and the inside of the molding unit chamber is maintained in the aseptic atmosphere.

Advantageous Effects of Invention

According to the heating apparatus and the heating method for preforms of the present invention, it is possible to heat the preform and to mold the preform into an aseptic bottle, while maintaining the sterility of the sterilized preform. Additionally, according to the aseptic blow molding machine and the aseptic molding method of the present invention, it is possible to mold an aseptic bottle while maintaining the sterility of the sterilized preform. Further, even with an aseptic filling machine including a sterilizing unit that sterilizes the preform, it is possible to secure a high sterility by including the heating apparatus for preforms and the aseptic blow molding machine of the present invention.

BRIEF DESCRIPTION OF DRAWINGS

FIG. 2 is a diagram showing a process of heating and molding a preform according to an embodiment of the present invention, in which FIG. 2(A) shows a heating process of the preform, and FIG. 2(B) shows a blow molding process of the heated preform into a bottle.

FIG. 8 is a diagram showing the operation of an extension rod of an aseptic blow molding machine according to an embodiment of the present invention, in which FIG. 8(A) shows the state where the extension rod is lifted, and FIG. 8(B) shows the state where the extension rod is lowered.

DESCRIPTION OF EMBODIMENTS

Modes for carrying out the present invention will be described below with reference to the drawings. The description will be given by assuming an embodiment of the present invention related to a heating apparatus and a heating method for preforms as Embodiment 1, and assuming an embodiment of the present invention related to an aseptic blow molding machine and an aseptic blow molding method as Embodiment 2.

Embodiment 1: Heating Apparatus and Heating Method for Preforms

A preform supplied from a preform supplying apparatus is sterilized in a sterilizing unit, and the sterilized preform is heated to the temperature at which the preform can be molded into a bottle, by a heating apparatus for preforms according to the present invention. The heated preform is molded into a bottle, and the summary of the heating apparatus for preforms and the heating method for preforms according to the present invention will be described by referring to FIG. 1, and further, the details of the heating apparatus for preforms will be described by referring to FIG. 2, FIG. 3, and FIG. 4. According to this Embodiment 1, it is possible to heat a preform to a temperature at which the preform is molded into a bottle, while maintaining the sterility of the sterilized preform.

(Summary of Heating Apparatus for Preforms)

Figure 1:
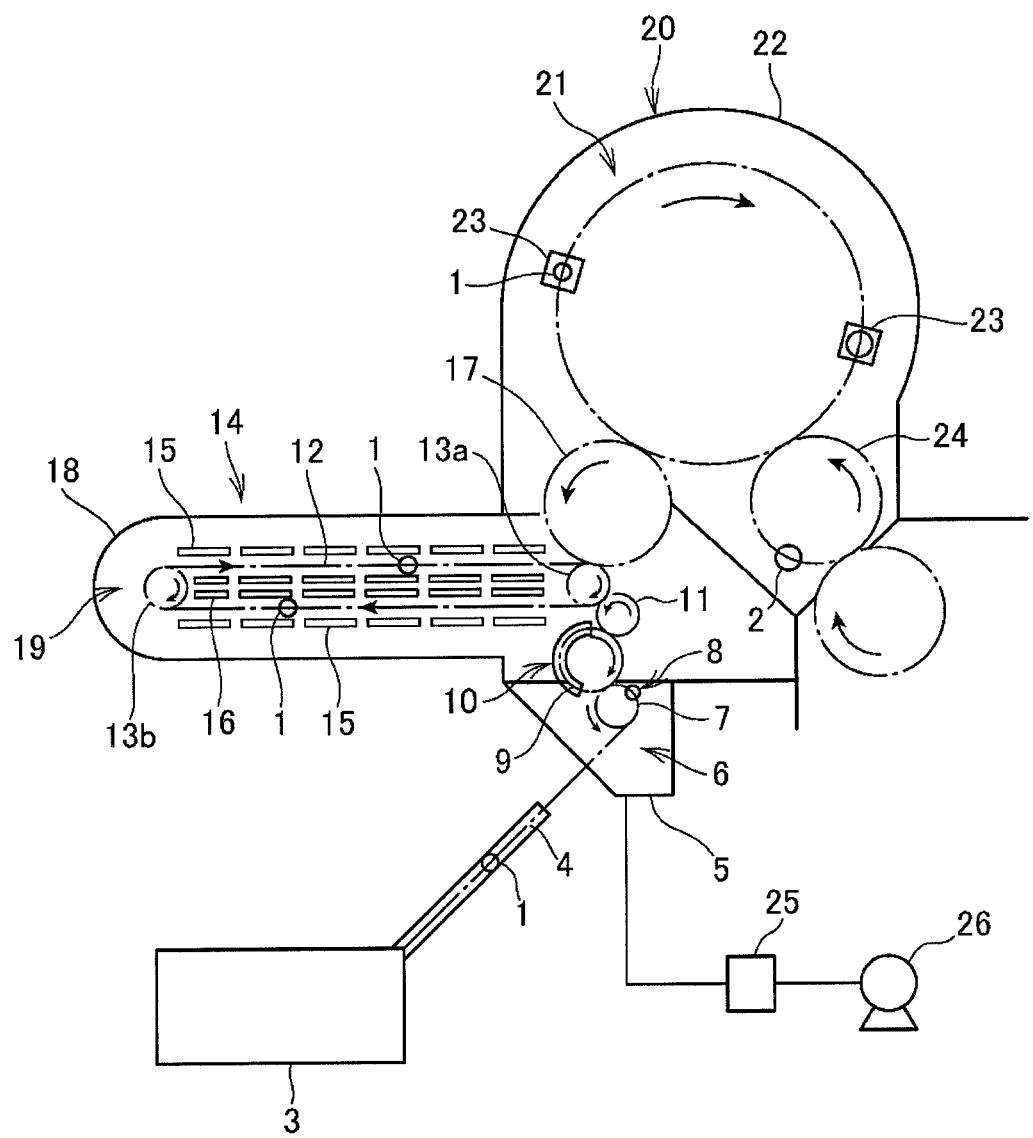
FIG. 1 is a plan view showing the outline of an example of a blow molding machine that incorporates a heating apparatus for preforms according to an embodiment of the present invention, and that molds a preform into a bottle.

A heating apparatus 14 for preforms of the present invention is an apparatus that heats a preform 1 shown in FIG. 2(A) to the temperature at which the preform 1 is molded into a bottle 2 shown in FIG. 2(B). As shown in FIG. 1, the preform 1 is supplied by a preform supplying apparatus 3, and the supplied preform 1 is sterilized by a sterilizing unit 6. The sterilized preform 1 is heated by the heating apparatus 14 for preforms of the present invention to a temperature at which molding can be performed, and is passed to and received by an aseptic blow molding machine 20. The heating apparatus 14 for preforms according to the embodiment of the present invention includes a heating unit 19 and a driving unit 28, and the heating unit 19 at least includes a heater 15, a reflector 16, a spindle 27, an endless chain 12, and a pulley 13 for rotating the endless chain 12. The sterilized preform 1 is held by the spindle 27 provided to the endless chain 12 at regular intervals, heated by the heater 15 to a temperature at which molding can be performed while rotating, and conveyed to the next process while maintaining the sterility.

The heating unit 19 of the heating apparatus 14 for preforms is covered by a heating unit chamber 18, and before operating the heating apparatus 14 for preforms, the inside of the heating unit chamber 18 is sterilized, an aseptic air is thereafter supplied into the heating unit chamber 18, and the inside of the heating unit chamber 18 is maintained at a positive pressure, and thus the preform 1 is heated to the temperature at which the preform 1 can be molded into the bottle 2 in a state where the sterility of the sterilized preform 1 is maintained.

In order to sterilize the inside of the heating unit chamber 18, a sterilizing apparatus is provided in the heating unit chamber 18. Additionally, in order to hold the heating unit chamber 18 at a proper positive pressure, an aseptic air supplying apparatus 31 and an exhaust apparatus 37 are provided.

The preform 1 heated by the heating apparatus 14 for preforms is molded into the bottle 2 by a blow molding unit 21, and the molded bottle 2 is sequentially conveyed to an inspection unit that inspects the bottle 2, a filling unit that fills the inspected bottle 2 with a sterilized content, and further a sealing unit that seals the bottle 2 filled with the content by a sterilized cap, and becomes an aseptic product filled with the content.

The inside of a molding unit chamber 22 that covers the molding unit 21, an inspection unit chamber that covers the inspection unit, and a filling chamber that covers the filling unit and the sealing unit is also sterilized before the operation, and the inside of the chambers are maintained at a positive pressure with an aseptic air, thereby maintaining the sterility in the chambers. As for the pressure maintained at the positive pressure, the pressure inside the filling unit chamber and the molding unit chamber 22 is set to be the highest pressure, and the pressure inside the inspection unit chamber and the heating unit chamber 18 is set lower than the highest pressure.

Figure 5:
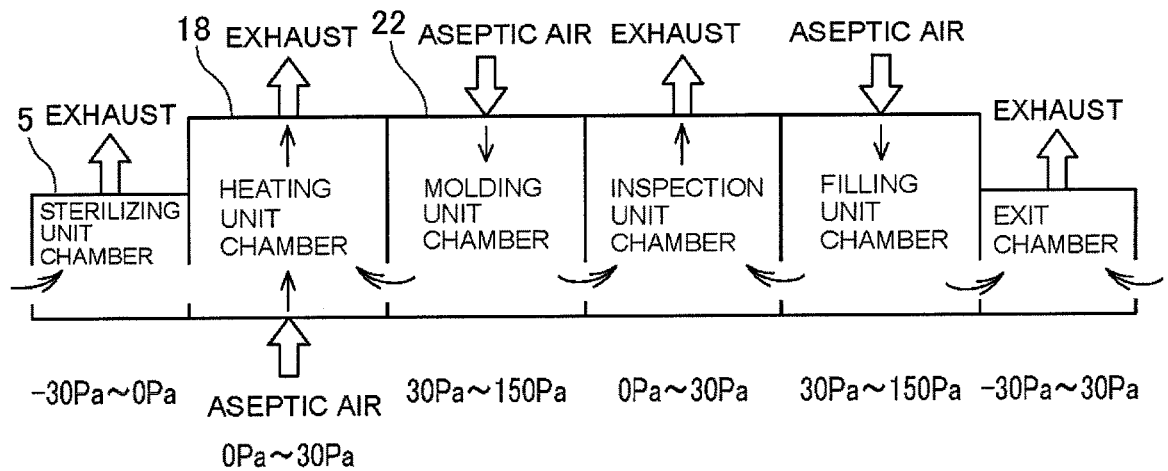
FIG. 5 is a diagram showing the flow and pressure of an aseptic air in each chamber of an aseptic filling machine incorporating a heating apparatus for preforms according to an embodiment of the present invention.

For example, as shown in FIG. 5, the pressure in the filling unit chamber is 30 Pa to 150 Pa, and the pressure in the inspection unit chamber is set to 0 Pa to 30 Pa for exhausting. Additionally, the pressure in the molding unit chamber is set to 30 Pa to 150 Pa, and the pressure in the heating unit chamber 18 is set to 0 Pa to 30 Pa. Further, an exit chamber, which is downstream from the sealing unit, discharges a product, and places an aseptic product on a conveyor and discharges the aseptic product to the outside of an aseptic filling machine, is a non-aseptic zone, and is exhausted and set to −30 Pa to 30 Pa.

Although an aseptic air supplying apparatus is provided in each chamber in order to maintain the inside of the chamber at a positive pressure, it is not necessary to provide the aseptic air supplying apparatus in all of the molding unit chamber 22, the inspection unit chamber, and the filling unit chamber. For example, the aseptic air supplied by the aseptic air supplying apparatus provided in the filling unit chamber may flow into the molding unit chamber 22 from the filling unit chamber, and the inside of the molding unit chamber 22 may be maintained at a positive pressure by the flowing aseptic air. In order to maintain the inside of a chamber at a proper pressure, an exhaust apparatus is provided. However, this may also not be provided in all of the molding unit chamber 22, the inspection unit chamber, and the filling unit chamber.

A sterilizing unit chamber 5 covering the sterilizing unit 6 that sterilizes the preform 1 is connected to an exhaust device, which is formed by a filter 25 that dissolves the disinfectant in the air in the sterilizing unit chamber 5, and a blower 26. By exhausting the air in the sterilizing unit chamber 5 during the operation of the sterilizing unit 6, the inflow of the disinfectant to the adjacent heating unit 19 can be prevented. As shown in FIG. 5, since the sterilizing unit chamber 5 is exhausted, the pressure in the sterilizing unit chamber 5 is set to −30 Pa to 0 Pa.

(Details of Heating Apparatus for Preforms and Heating Method for Preforms)

First, the preform 1 shown in FIG. 2(A) is continuously conveyed with a preform supplying conveyor 4 at a desired speed by the preform supplying apparatus 3 shown in FIG. 1 to the sterilizing unit 6 for the preform 1.

The preform 1 in the present Embodiment 1 is a test tube-like bottomed tubular body, and an opening 1a similar to that of the bottle 2 shown in FIG. 2(B) is given at the time of molding. A male screw is formed in this opening 1a simultaneously with the molding of the preform 1. Additionally, a support ring 1b for conveyance is formed in a lower part of the opening 1a of the preform 1. The preform 1 or the bottle 2 is conveyed within the sterilizing unit 6 while being gripped by a gripper, which is not shown, via this support ring 1b. The preform 1 is molded by injection molding, compression molding, etc. The material of the preform 1 is formed by a thermoplastic resin, such as polyethylene terephthalate, polyethylene naphthalate, polypropylene, and polyethylene, and may be a single body or a combined body of these thermoplastic resins, or may include a recycled thermoplastic resin. Additionally, in order to give a barrier property, a thermoplastic resin such as an ethylene-vinyl alcohol-copolymer or polyamide having aromatic amine such as meta-xylene diamine as a monomer may be included as a layer or as a mixture.

The preform 1 is passed to and received by a preform sterilization wheel 7 by being gripped by the gripper provided in the preform sterilization wheel 7 at regular intervals from the preform supplying conveyor 4. In order to sterilize the preform 1, the gas or mist of a disinfectant or a mixture of these is sprayed on the internal and external surfaces of the passed and received preform 1. The bacteria etc. adhering to the surfaces of the preform 1 are sterilized by the disinfectant sprayed on the preform 1.

Figure 4:
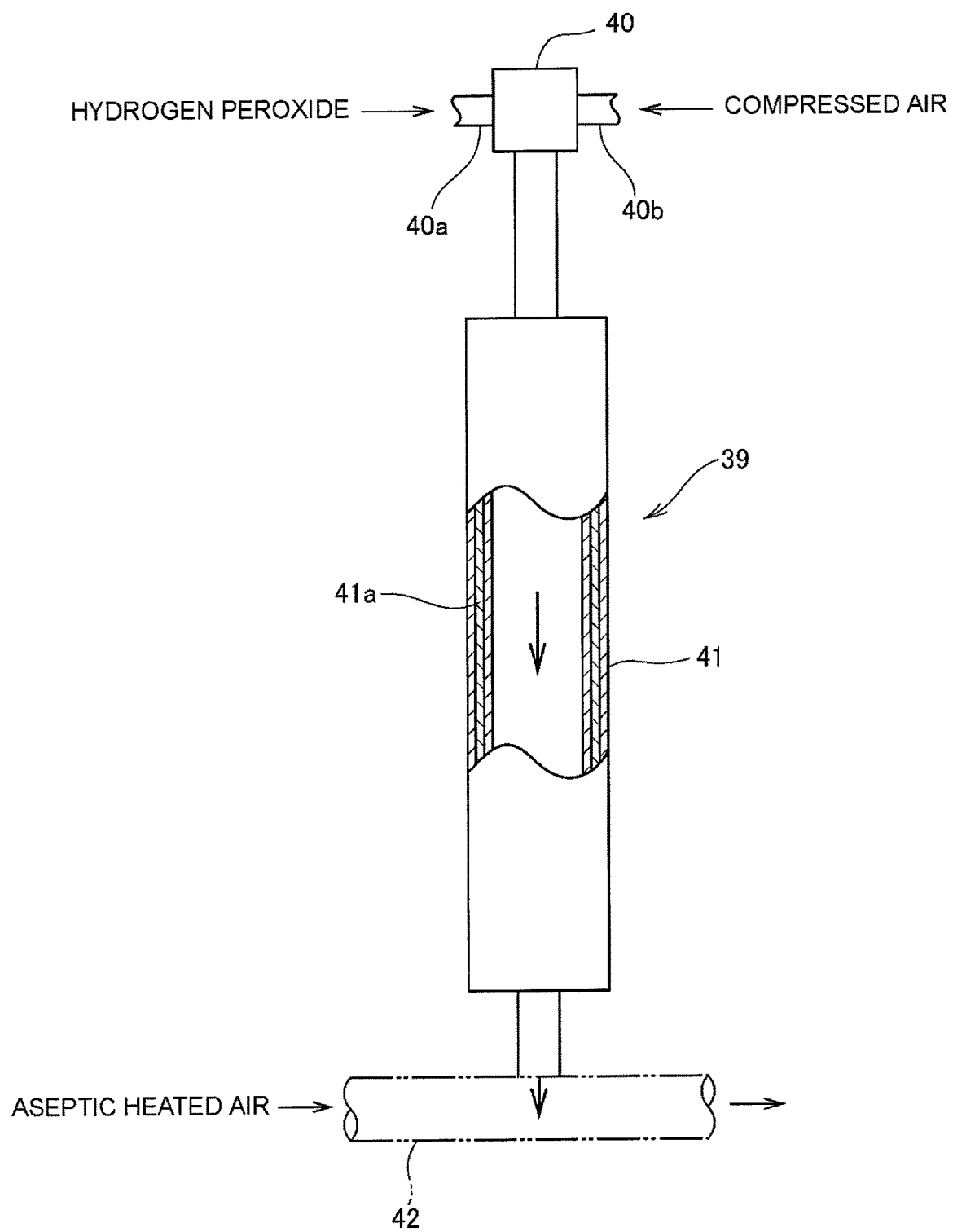
FIG. 4 is a diagram showing a disinfectant gas generator provided in a sterilizing apparatus according to an embodiment of the present invention.

The gas or mist of the disinfectant or the mixture of these is a part of the gas of the disinfectant that is generated by a disinfectant gas generator 39 as shown in FIG. 4 described later, and that is turned into mist. The device by which the gas or mist of the disinfectant or the mixture of these is sprayed on the preform 1 is a nozzle that sprayed the gas or mist of the disinfectant or the mixture of these on the inner surface of the preform 1 by a nozzle, and the gas or mist of the disinfectant or the mixture of these that overflowed collides with an umbrella-like member provided in a nozzle tip, and contacts the outside surface of the preform 1. Additionally, a nozzle may be provided separately, and the gas or mist of the disinfectant or a mixture of these may be directly sprayed on the outside surface of the preform 1. As long as the gas or mist of the disinfectant or the mixture of these can contact the internal and external surfaces of the preform 1, any device may be used.

Further, the preform 1 may be pre-heated by blowing a hot air on the preform 1, etc., immediately before spraying the gas or mist of the disinfectant or the mixture of these on the preform 1. This pre-heating can further increase the sterilizing effect for the preform 1.

It is preferable for the disinfectant sprayed on the preform 1 to include at least hydrogen peroxide. A proper range for its content is 0.5 mass % to 65 massa. When less than 0.5 mass %, the sterilizing power may be insufficient, and when exceeding 65 mass %, it becomes difficult to handle for safety reasons. Additionally, 0.5 mass % to 40 mass % is more preferably, and when 40 mass % or less, since it becomes more easy to handle, and the concentration becomes low, the residual among of hydrogen peroxide after sterilization can be reduced.

When the disinfectant sprayed on the preform 1 includes hydrogen peroxide, the amount of the disinfectant made to adhere to the internal and external surfaces of the preform 1 is preferably in the range of 0.001 µL/cm$^2$ to 0.5 µL/cm$^2$ by using a hydrogen peroxide solution including 35 mass % of hydrogen peroxide. When the adhering amount is less than 0.001 µL/cm$^2$, a sufficient sterilizing effect cannot be obtained.

Additionally, when this adhering amount exceeds 0.5 µL/cm$^2$, in the case where the preform 1 is blow molded into the bottle 2, it becomes easy for defective molding to occur, such as bleaching, spots, wrinkles, and deformation. More preferably, the adhering amount of the hydrogen peroxide solution including 35 mass % of hydrogen peroxide for the preform 1 is 0.002 µL/cm$^2$ to 0.4 µL/cm$^2$.

Additionally, though the disinfectant includes water, the disinfectant may include one or two or more of alcohols such as methyl alcohol, ethyl alcohol, isopropyl alcohol, normal propyl alcohol, and butyl alcohol, ketones such as acetone, methyl ethyl ketone, and acetylacetone, glycol ether, etc.

Further, the disinfectant may include organic acids such as peracetic acid and acetic acid, chlorine compounds such as sodium hypochlorite, alkaline compounds such as sodium hydroxide and potassium hydroxide, compounds having the sterilizing effect such as nitric acid, ozone, acid water, etc., and additive agents such as cationic surfactant, nonionic surfactant, phosphoric acid compound, etc.

Before or after spraying the disinfectant on the preform 1, light including ultraviolet light or an electron beam having a wavelength of 100 nm to 380 nm may be irradiated to the preform 1, so as to improve the sterilizing effect. Additionally, the preform 1 may be sterilized by irradiating the light including ultraviolet light or the electron beam having the wavelength of 100 nm to 380 nm to the preform 1, without using the disinfectant.

The inside of the sterilizing unit chamber 5 is sterilized before the operation by a device of spraying, etc. the disinfectant such as hydrogen peroxide solution. Therefore, a disinfectant spraying nozzle is provided in a wall surface inside the sterilizing unit chamber 5, separately from a disinfectant gas spraying nozzle 8 for spraying the gas or mist of the disinfectant or a mixture of these on the preform 1. Additionally, a similar disinfectant spraying nozzle is also provided in order to sterilize a sterilizing unit chamber 5 side surface of the filter 25 contacting the sterilizing unit chamber 5.

The preform 1 on which the gas or mist of the disinfectant or the mixture of these was sprayed is passed to and received by an air spraying wheel 9 as shown in FIG. 1. An aseptic air is blown by an air blowing nozzle 10 on the preform 1 passed to and received by the wheel 9, while the preform 1 is conveyed by the gripper. The aseptic air is obtained by letting the air by a blower pass through an aseptic filter. Compressed air generated by a compressor may be used without using the blower.

By blowing the aseptic air, the disinfectant adhering to the surface of the preform 1 is activated, thereby sterilizing the bacteria, etc. that were not sterilized by spraying the disinfectant on the preform 1. Additionally, by blowing the air, the disinfectant adhering to the preform 1 is quickly removed from the surfaces of the preform 1. Since the disinfectant adhering to the preform 1 is removed from the preform 1 by blowing the aseptic air before entering the heating unit 19, various kinds of equipment such as a sealing member of the heating unit 19 is not damaged by the disinfectant. Additionally, the occurrence of defective molding of the bottle, such as bleaching, distortion, and molding unevenness, resulting from the adhesion of the disinfectant to the preform 1 is prevented.

The aseptic air blown on the preform 1 may be at room temperature, or may be heated. However, it is preferable for the aseptic air to be heated, and by using the heated aseptic hot air, the dissolution of the disinfectant is facilitated, the sterilizing effect is increased, and the residual of the disinfectant is also reduced. It is preferable for the temperature of the aseptic hot air blown on the preform 1 to be set from 40° C. to 140° C. When less than 40° C., the effect obtained by heating is less, and when the temperature of preform 1 exceeds 70° C., there is an inconvenience such as deformation of the opening 1a of the preform 1. Therefore, it is preferable for the temperature of the hot air not to exceed 140° C.

The blowing of the aseptic air on the preform 1 is not essential, and may not be performed. When not performing, after the gas of the disinfectant is sprayed on the preform 1, the preform 1 is directly heated. The disinfectant is adhering to the internal and external surfaces of the preform 1 on which the gas of the disinfectant was sprayed, and when the preform 1 is heated to the molding temperature, the adhering disinfectant is activated, and the surface of the preform 1 is sterilized. Additionally, an excessive disinfectant is vaporized by heating.

After blowing the aseptic air, the preform 1 is passed to and received by a wheel 11 shown in FIG. 1. Here, the preform 1 is released from the gripper, the spindle 27 is inserted into the opening 1a of the preform 1 as shown in FIG. 2(A), and the preform 1 is conveyed into the heating unit 19 by the endless chain 12.

Figure 3:
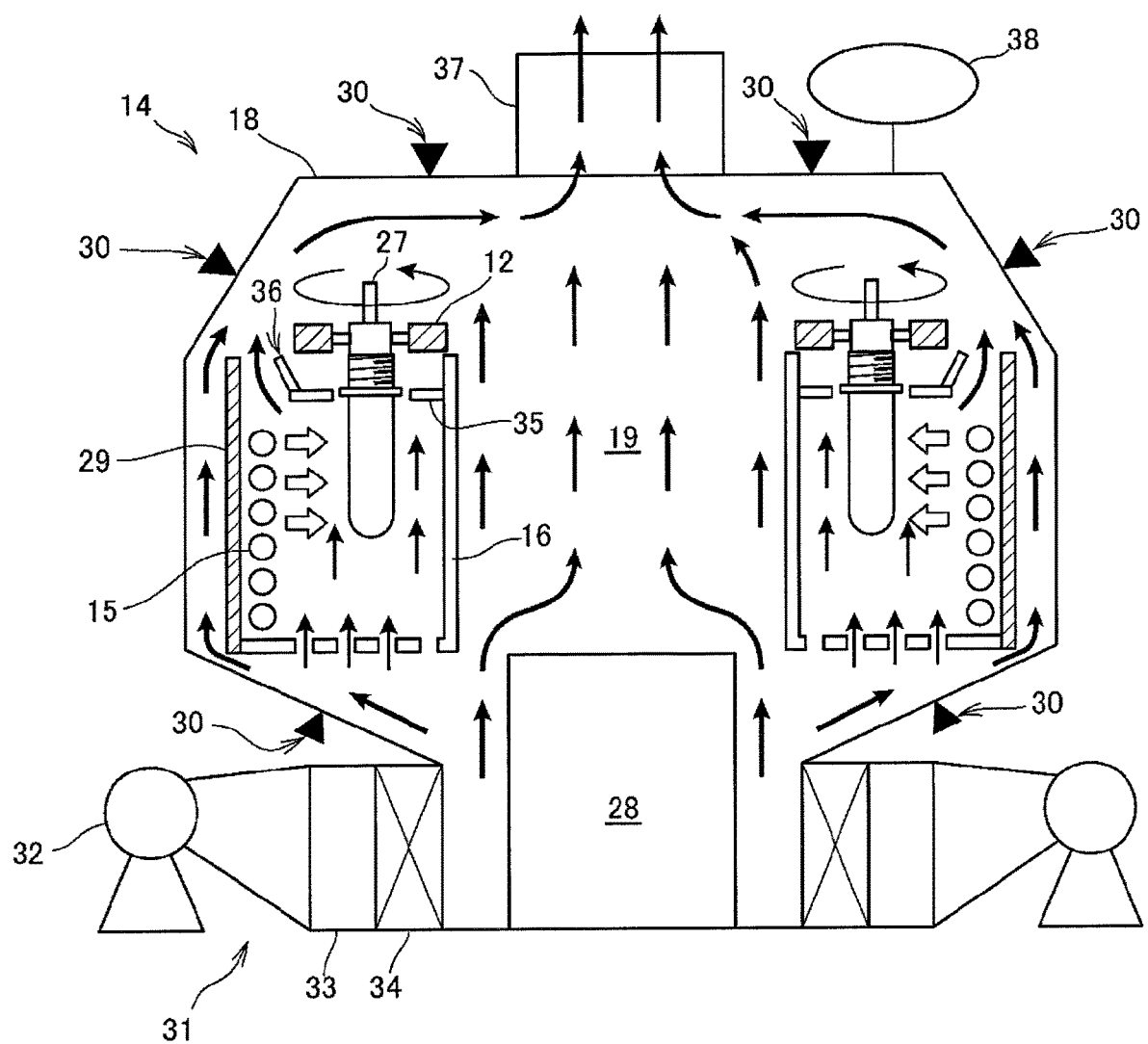
FIG. 3 is a cross-sectional view showing the outline of an example of a heating apparatus for preforms according to an embodiment of the present invention.

As shown in FIG. 3, the heating apparatus 14 for preforms consists of the heating unit 19 and the driving unit 28. The heating unit 19 at least includes a heater 15 for heating the preform 1, a reflector 16 for reflecting the heat of the heater 15 and efficiently heating the preform 1, the spindles 27 for holding and rotating the preform 1, the endless chain 12 for moving the spindles 27 on which the spindles 27 are provided at regular intervals, and pulleys 13a and 13b for rotating the endless chain 12. Additionally, in order to prevent the heat of the heater 15 from conducting to the outside of the heating apparatus 14 for preforms, a heat insulating material 29 may be provided on the outer side the heater 15.

The driving unit 28 is provided with a motor, an operation transmitting device, etc. Since the equipment of the driving unit 28 requires a lubricant, and contamination is accumulated, it is difficult to maintain the sterility.

Heater 15 is preferably a halogen lamp that emits an infrared light. A plurality of halogen lamps as heaters 15 are provided in parallel to be perpendicular to the axis direction of the preform 1. The preform 1 is heated by near infrared rays, infrared light, far-infrared rays emitted from the halogen lamps of the heaters 15. The heating temperature of the plurality of provided halogen lamps is controlled, and a temperature difference may be provided for the heating temperature in the axis direction of the preform 1. Additionally, a plurality of units of halogen lamps are provided with respect to the moving direction of the preform 1 as shown in FIG. 1. Although in FIG. 1, 6 units on either column, 12 units in total are provided, the number of units can be arbitrarily determined. The temperature of these halogen lamp units is controlled, and may be set to be a high temperature at the beginning of heating, and to a low temperature at the end of heating.

As shown in FIG. 2(A), the preform 1 conveyed to the heating unit 19 is heated by infrared heating by the heaters 15 or other heating device to a temperature suitable for the later blow molding. This temperature is preferably 90° C. to 130° C. Note that the temperature of the opening 1a of the preform 1 is suppressed to a temperature of 70° C. or less, in order to prevent deformation, etc.

In order to prevent overheating of the opening 1a of the preform 1, as shown in FIG. 3, an opening protection member 35, which is formed as a surface perpendicular to the axis direction of the preform 1, is provided under a support ring 1b of the preform 1. The opening protection member 35 prevents the infrared light, etc. that is emitted from the heaters 15 from reaching the opening 1a of the preform 1 more than necessary. Additionally, in order to prevent an increase in the temperature of the opening 1a due to an upward current generated by the heat of the heaters 15, a planar heat shield plate 36 may be provided at an angle of 90 degrees or less with respect to the axis direction of the preform 1.

However, when the temperature of the opening 1a is less than 40° C., the sterilizing effect for the opening 1a may be degraded. In order to avoid this, a focus lamp that positively increases the temperature of the opening 1a may be provided in the heating unit 19, and the opening 1a may be heated by the focus lamp, so that the temperature of the opening 1a becomes 40° C. to 70° C. In this manner, the sterilizing effect for the opening 1a can be improved, and the disinfectant adhering to the surface of the opening 1a can be vaporized and removed.

Although the preform 1 is heated by the infrared light, etc. that is emitted from the heaters 15, the infrared light reaching behind the preform 1 without being absorbed by the preform 1 does not contribute to heating. Therefore, as shown in FIG. 3, by providing the reflector 16 behind the preform 1, the infrared light, etc. reaching behind the preform 1 is reflected, and the heating of the preform 1 can be efficiently performed. The reflector 16 obtained by vapor-depositing or plating gold, silver, or aluminum on a metal is used. As long as it can reflect infrared light, etc., any kind of object may be used. The reflector 16 may be a flat surface, a curved surface, or a combination of a flat surface and a curved surface. The reflector 16 may be provided not only behind the preform 1, but also behind the heaters 15, so as to reflect the infrared light, etc. that is emitted behind the heaters 15.

As shown in FIG. 2(A), the spindle 27 is inserted into the opening 1a, and the preform 1 is conveyed within the heating unit 19 while being rotated. The preform 1 is supported by the spindle 27 by elastic deformation of an elastic body such as a rubber or a spring, when the lower part of the spindle 27 is inserted into the opening 1a. The spindle 27 is held by the endless chain 12. The endless chain 12 is rotated by the pulleys 13a and 13b. It is also possible to convey the preform 1 while rotating the preform 1 in an inverted state, by inserting a mandrel in the preform 1, instead of the spindle 27.

The inside of the heating unit chamber 18 is sterilized before the heating apparatus 14 for preforms is operated. Therefore, a sterilizing apparatus is provided in the heating unit chamber 18. The sterilizing apparatus is a disinfectant nozzle 30 that sprays the gas or mist of the disinfectant or the mixture of these in the heating unit chamber, and the disinfectant gas generator 39 that generates the gas of the disinfectant.

As shown in FIG. 3, the disinfectant nozzles 30 are provided in wall surfaces of the heating unit chamber 18, and the gas or mist of the disinfectant or the mixture of these is sprayed into the heating unit chamber 18 from the disinfectant nozzles 30. From the disinfectant nozzles 30, the gas of the disinfectant generated by the disinfectant gas generator 39 shown in FIG. 4 is sprayed on the heating unit 19 in the heating unit chamber 18, and on the wall surfaces of the heating unit chamber 18.

As shown in FIG. 4, the disinfectant gas generator 39 includes a disinfectant supplying unit 40 that is a two-fluid spray nozzle supplying the disinfectant in drops, and a vaporizing unit 41 that heats the disinfectant supplied from this disinfectant supplying unit 40 to a dissolution temperature or less to vaporize the disinfectant. The disinfectant supplying unit 40 takes in the disinfectant and the compressed air from a disinfectant supply path 40a and a compressed air supply path 40b, respectively, and sprays the disinfectant into the vaporizing unit 41. The vaporizing unit 41 is a pipe that interposes a heater 41a between the inner and outer walls, and heats and vaporizes the disinfectant sprayed into this pipe. The gas of the vaporized disinfectant is ejected out to the outside of the vaporizing unit 41 from the lower end of the vaporizing unit 41. The vaporizing unit 41 may be heated by dielectric heating instead of the heater 41a.

As for the operating condition of the disinfectant supplying unit 40, for example, the pressure of the compressed air is adjusted in the range of 0.05 MPa to 0.6 MPa. Additionally, the disinfectant may fall down by gravity, or a pressure may be applied to the disinfectant, and the supply amount can be set freely. For example, it is supplied in the range of 1 g/min. to 100 g/min. Additionally, in the inner surface of the vaporizing unit 41, the sprayed disinfectant is vaporized by being heated from 140° C. to 450° C.

As shown in FIG. 4, the gas of the ejected out disinfectant is mixed with the aseptic heated air blown into a conduit 42, so as to be the gas or mist of the disinfectant or the mixture of these, and is sprayed into the heating unit chamber 18 from the disinfectant nozzles 30. Although the spray amount of the gas or mist of the disinfectant or the mixture of these is arbitrary, the spray amount is determined by the amount of the disinfectant supplied to the disinfectant gas generator 39, and the spraying time. A plurality of disinfectant gas generators 39 may be provided. When the disinfectant is a hydrogen peroxide solution, a proper range for the concentration of hydrogen peroxide is 1 mg/L to 20 mg/L. When less than 1 mg/L, the sterilization becomes insufficient, and when exceeding 20 mg/L, there is a possibility that members in the heating unit chamber 18 are degraded. Additionally, the disinfectant may be turned into mist by the two-fluid spray, and may be sprayed into the heating unit chamber 18 from the disinfectant nozzles 30. In this case, the mist of the disinfectant may be sprayed toward the heaters 15, and the disinfectant may be vaporized with the heat of the heaters 15.

Additionally, it is also possible to sterilize the inside of the heating unit chamber 18 while suppressing a variation in the disinfectant adhering amount to the apparatus of the heating unit 19, by operating the heating unit 19 in a state where the gas or mist of the disinfectant or the mixture of these is sprayed into the heating unit chamber 18. Specifically, by driving the spindles 27, the gripper, a cam roller, etc. in the heating unit chamber 18, it is possible to make the disinfectant adhere uniformly over the surfaces of these apparatuses.

As for the disinfectant sterilizing the inside of the heating unit chamber 18, a disinfectant similar to that used for sterilizing the preform 1 can be used, and it is preferable to use a disinfectant that includes peracetic acid or hydrogen peroxide. As for spraying of the disinfectant, different disinfectants may be sprayed for multiple times.

After the gas or mist of the disinfectant or the mixture of these is sprayed into the heating unit chamber 18 from the disinfectant nozzles 30, the aseptic air is sprayed into the heating unit chamber 18. The aseptic air vaporizes and removes the disinfectant remaining in the heating unit chamber 18. Additionally, on this occasion, the vaporizing disinfectant may also exhibit the sterilizing effect.

In order to blow the aseptic air into the heating unit chamber 18 from the lower part, as shown in FIG. 3, the aseptic air supplying apparatus 31 is provided in the lower part of the heating unit chamber 18. The aseptic air supplying apparatus 31 includes a blower 32 and an aseptic filter 34. Additionally, there are cases where the aseptic air is heated, and it is preferable to provide an aseptic air heating apparatus 33 between the blower 32 and the aseptic filter 34.

After the air by the blower 32 is heated by the aseptic air heating apparatus 33, and is sterilized by the aseptic filter 34, the air becomes an aseptic hot air and is blown into the heating unit chamber 18 from the lower part. Although the aseptic air may not be heated, when heated, the removal of the disinfectant is quickly performed, and the sterilizing effect of the disinfectant is also increased. In order to maintain the sterility in the heating unit chamber 18 at the time of operation of the heating apparatus 14 for preforms, when the aseptic air is supplied to the heating unit chamber 18, the aseptic air may not be heated.

In the sterilization in the heating unit chamber 18 before operating the heating apparatus 14 for preforms, the inner surface side of the aseptic filter 34 consisting of a HEPA filter, etc. is also sterilized, since the gas or mist of the disinfectant or the mixture of these is sprayed by the disinfectant nozzles 30.

Since the inside of the heating unit chamber 18 is heated by the heaters 15, an upward current is generated. It is possible to make the aseptic air flow more smoothly without generating a turbulent flow in the heating unit chamber 18, by making the aseptic air flow in the same direction as this upward current, rather than making the aseptic air flow from the upper side to the lower side. Accordingly, the aseptic air is blown into the heating unit chamber 18 from the lower part to the upper part. As shown in FIG. 3, the aseptic air blown into from the lower part flows through the outer sides and the inner sides of the heaters 15 and the reflectors 16 toward the upper part.

In order to efficiently perform heating of the preform 1, the flow rate of the aseptic air made to flow between the heater 15 and the reflector 16 may be controlled by adjusting the opening areas of a plate that is provided in the lower part of the preform 1. Additionally, the cooling effect by the flow of the aseptic air between the heater 15 and the reflector 16 may be suppressed by heating the aseptic air.

As shown in FIG. 3, the exhaust apparatus 37 is provided on the heating unit chamber 18, and the aseptic air is exhausted to the outside of the heating apparatus 14 for preforms, thereby properly maintaining the pressure in the heating unit chamber 18. As shown in FIG. 3, the pressure in the heating unit chamber 18 is always measured by providing a pressure sensor 38 on the heating unit chamber 18. The blower 32 and the exhaust apparatus 37 are controlled according to the measured air pressure value, and the pressure in the heating unit chamber 18 is properly maintained.

As shown in FIG. 1, the heated preform 1 is released from the spindle 27, passed to and received by the gripper of the wheel 17, and further conveyed to the aseptic blow molding machine 20. The preform 1 is supplied to a mold 23 provided in the molding unit 21 of the aseptic blow molding machine 20, while maintaining the sterility.

The inside of the molding unit chamber 22 is sterilized before the operation of the aseptic blow molding machine 20 with the disinfectant such as hydrogen peroxide solution, and during the operation, the aseptic air is supplied, and the sterility in the molding unit chamber 22 is maintained. In order to sterilize the inside of the molding unit chamber 22 with the disinfectant, similar to the heating unit chamber 18, a disinfectant nozzle for spraying the disinfectant is provided in a wall surface of the molding unit chamber 22. Since the sterility of the molding unit chamber 22 is maintained, the molded bottle 2 also has the sterility.

By closing split molds 23a and 23b and a bottom mold 23c of the mold 23, the preform 1 is passed to and received by the aseptic blow molding machine 20 from the wheel 17. Thereafter, a blow nozzle 43 is joined to the opening 1a of the preform 1, an extension rod 44 is guided by a hole provided in the blow nozzle 43 to be inserted into the preform 1, and simultaneously, an intermediate pressure air and a high pressure air are sequentially sent into the preform 1 by the operation of an electromagnetic valve of a valve block, which is not shown, and the preform 1 is molded into the bottle 2.

The bottle 2 molded by the aseptic blow molding machine 20 is conveyed to the inspection unit chamber via a wheel 24. The bottle 2 that is inspected in the inspection unit chamber, and determined to have no defect is conveyed to the filling unit chamber, filled with a sterilized content, sealed by a sterilized cap, and taken out to a non-aseptic atmosphere as an aseptic product. Although the inspection may not be performed, in the case where a foreign matter, discoloration, a crack, etc. of the body of the bottle 2, a top panel of the opening 1a, the support ring 1b, a bottom part, etc. are inspected, and when it is determined to exceed the limit, the bottle 2 is discharged as the bottle 2 with a defect.

Embodiment 2: Aseptic Blow Molding Machine and Aseptic Blow Molding Method

Figure 2:
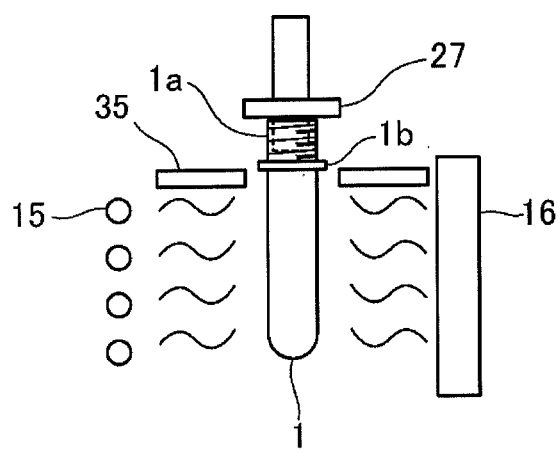
Figure 2:
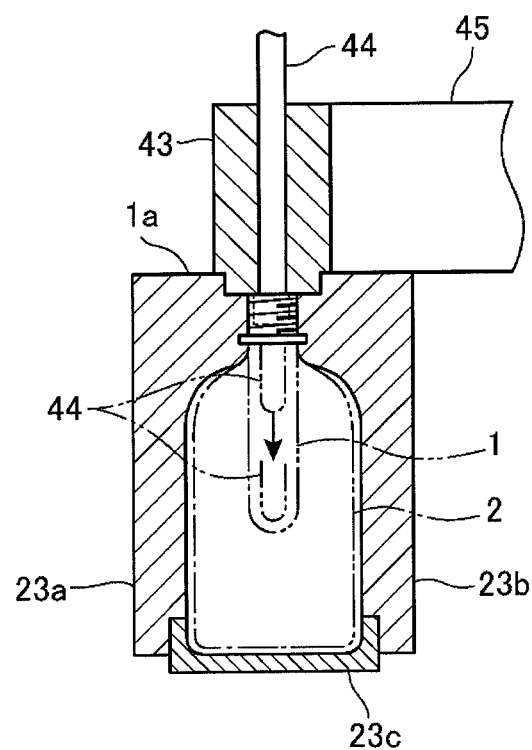
Figure 6:
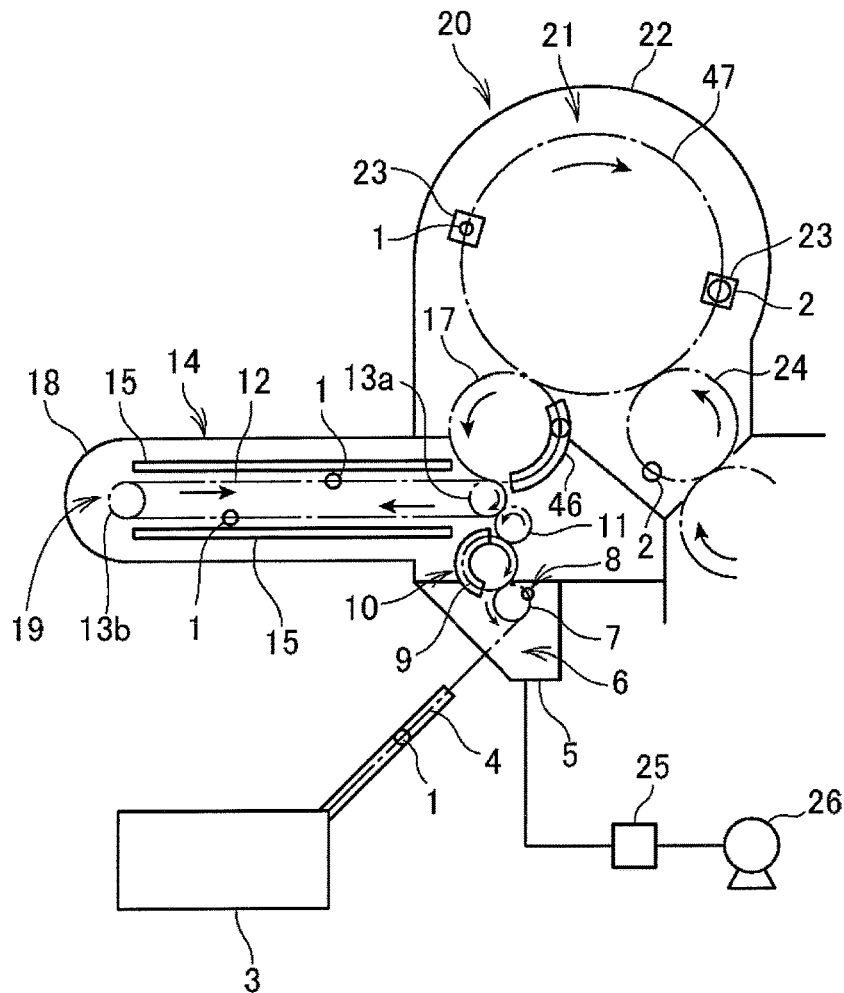
FIG. 6 is a plan view showing the outline of an example of an apparatus that molds a preform into a bottle, according to an embodiment of the present invention.
Figure 7:
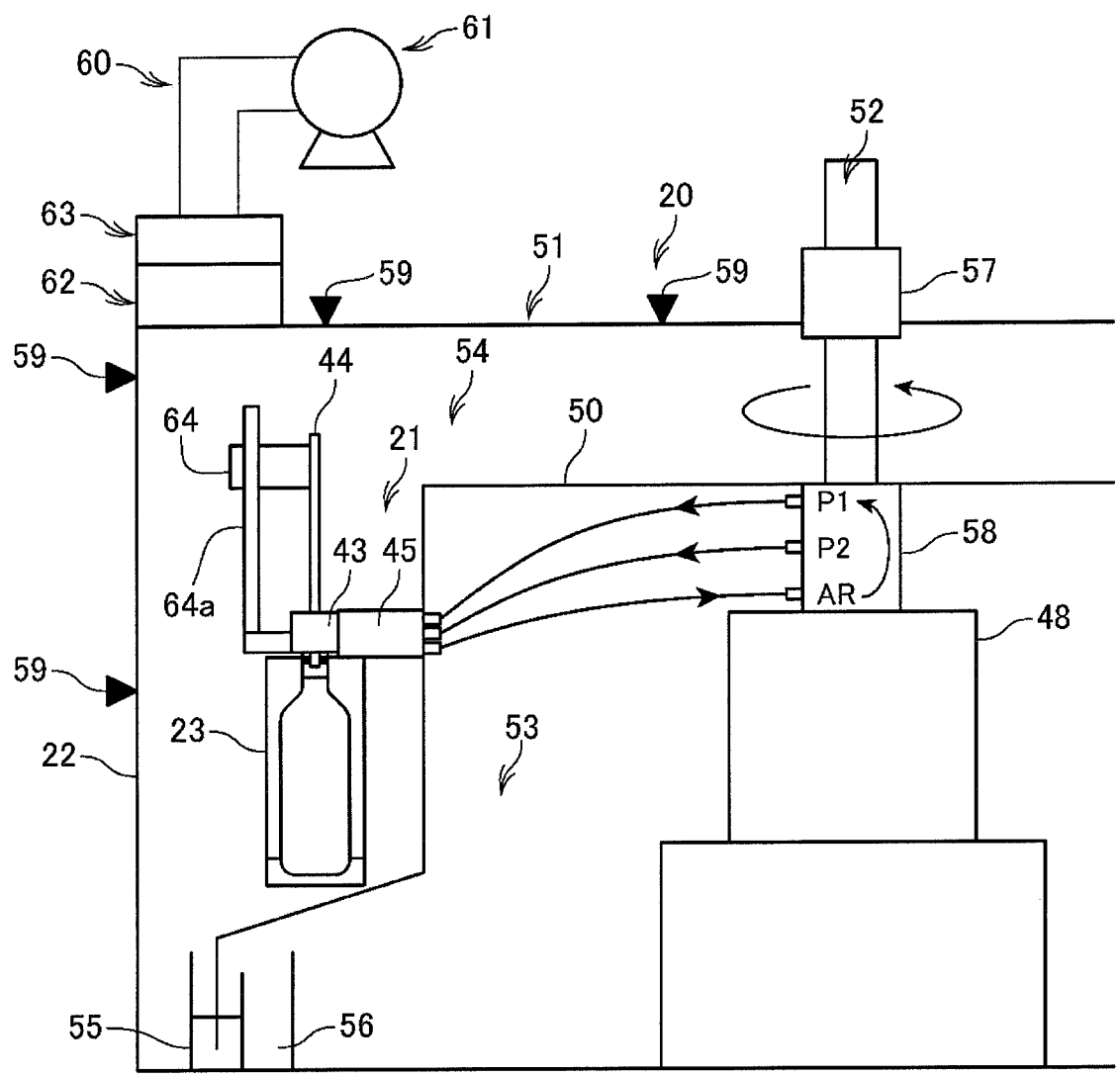
FIG. 7 is a cross-sectional view showing the outline of an example of an aseptic blow molding machine according to an embodiment of the present invention.
Figure 8:
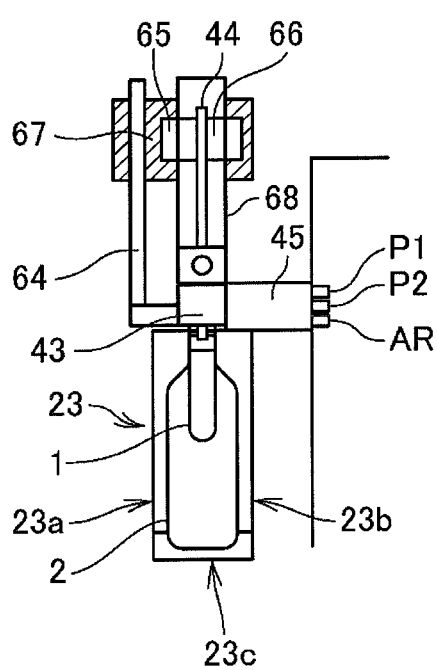
Figure 8:
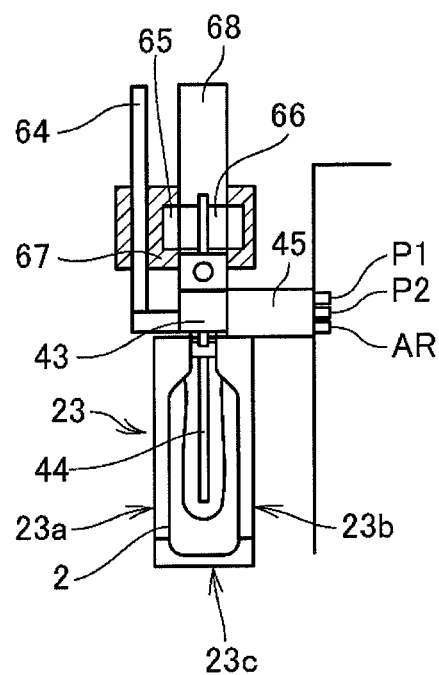

First, referring to FIG. 6, the summary of the sterilizing unit that sterilizes the preform supplied from the preform supplying apparatus, the heating unit that heats the sterilized preform to a temperature at which the preform is molded into a bottle, and the aseptic blow molding machine that molds the heated preform into the bottle is described, and referring to FIG. 2, FIG. 7, and FIG. 8, each detail of the aseptic blow molding machine will be further described. According to this embodiment, the sterilized preform can be molded into an aseptic bottle.

(Summary of Blow Molding Machine)

The aseptic blow molding machine 20 of the present invention is an apparatus that molds the preform 1 shown in FIG. 2(A) into the bottle 2 shown in FIG. 2(B). As shown in FIG. 6, the preform 1 is supplied by the preform supplying apparatus 3, and the supplied preform 1 is sterilized by the sterilizing unit 6. The sterilized preform 1 is heated to the molding temperature by the heating unit 19, and passed to and received by the aseptic blow molding machine 20 of the present invention. The aseptic blow molding machine 20 according to Embodiment 2 of the present invention includes the molding unit 21 that molds the preform 1 into the bottle 2, and the molding unit 21 includes the mold 23 provided in the outer circumference of a molding wheel 47 at regular intervals. The preform 1 is molded into the bottle 2 having the shape of the mold 23, while being conveyed in the outer circumference of the molding wheel 47. The molded bottle 2 is conveyed to the next process, while maintaining the sterility.

The molding unit 21 is covered by the molding unit chamber 22, and before operating the aseptic blow molding machine 20, the inside of the molding unit chamber 22 is sterilized, the aseptic air is thereafter supplied into the molding unit chamber 22, and the inside of the molding unit chamber 22 is maintained at a positive pressure. Accordingly, the aseptic bottle 2 can be obtained in a state where the sterility of the sterilized preform 1 is maintained.

The molded bottle 2 is sequentially conveyed to the inspection unit that inspects the bottle 2, the filling unit that fills the inspected bottle 2 with a sterilized content, and further, the sealing unit that seals the bottle 2 filled with the content by a sterilized cap, and an aseptic product filled with the content is obtained.

The inspection unit chamber that covers the inspection unit, and the filling unit chamber that covers the filling unit and the sealing unit are also sterilized before the operation, and the inside of the chambers is maintained at a positive pressure by the aseptic air. Accordingly, the sterility in the chambers is maintained. As for the pressure maintained at the positive pressure, the filling unit chamber is set to have the highest pressure, and the more upstream the chamber is, such as the inspection unit chamber, and the molding unit chamber 22, the lower the pressure is set. The aseptic air is also supplied to the heating unit chamber 18, which is upstream of the molding unit chamber 22, in order to maintain the sterility during the operation. For example, the pressure in the filling unit chamber is 30 Pa to 150 Pa, the pressure in the inspection unit chamber is set to 30 Pa to 50 Pa, the pressure in the molding unit chamber 22 is set to 20 Pa to 30 Pa, and the pressure in the heating unit chamber 18 is set to 0 Pa to 20 Pa. Additionally, the exit chamber that is downstream of the sealing unit, discharges a product, and places the aseptic product on a conveyor to discharge the product to the outside of the aseptic filling machine is set to 0 Pa to 20 Pa.

Although the aseptic air supplying apparatus is provided in each of the chambers in order to maintain each of the chambers at a positive pressure, it is unnecessary to provide the aseptic air supplying apparatus in all of the chambers. For example, the inside of the inspection unit chamber may be maintained at a positive pressure by the aseptic air that flows into the inspection unit chamber from the filling unit chamber. Additionally, when the inspection unit is not provided, the inside of the molding unit chamber 22 may be maintained at a positive pressure by the aseptic air that flows into the molding unit chamber 22 from the filling unit chamber. In order to maintain the pressures in the chambers at proper pressures, an exhaust apparatus may be provided in each of the chambers. This may also not be provided in all of the chambers. For example, the inside of the molding unit chamber 22 may be maintained at a proper pressure by the exhaust apparatus provided in the heating unit chamber 18.

In order to secure the sterility of the inspection unit chamber, the inside of the inspection unit chamber is sterilized before the operation. However, in order to prevent degradation of inspection equipment due to the disinfectant, a camera, a lamp, etc., which are the inspection equipment, may be sealed. In order to maintain the sterility in the inspection unit chamber at the time of the operation, the aseptic air is supplied, and the inside of the inspection unit chamber is maintained at a positive pressure.

The sterilizing unit chamber 5 covering the sterilizing unit 6 that sterilizes the preform 1 is exhausted by the blower 26 as in Embodiment 1.

(Details of Aseptic Blow Molding Machine)

First, the preform 1 shown in FIG. 2(A) is continuously conveyed by the preform supplying conveyor 4 at a desired speed from the preform supplying apparatus 3 shown in FIG. 6 to the sterilizing unit 6 for preforms 1. The preform 1 in present Embodiment 2 is the same as that in Embodiment 1.

The preform 1 conveyed to the sterilizing unit 6 is sterilized as in Embodiment 1. The disinfectant used is the same as that in Embodiment 1. As in Embodiment 1, the gas or mist of the disinfectant or the mixture of these sprayed on the preform 1 is a part of the gas of the disinfectant that is generated by the disinfectant gas generator 39 as shown in FIG. 4, and that is turned into mist. As long as the gas or mist of the disinfectant or the mixture of these can contact the internal and external surfaces of the preform 1, any kind of device may be used.

Further, as in Embodiment 1, pre-heating may be performed immediately before spraying the gas or mist of the disinfectant or the mixture of these on the preform 1. Additionally, as in Embodiment 1, light including ultraviolet light or an electron beam, etc. may be irradiated to the preform 1 before or after spraying the disinfectant, so as to improve the sterilizing effect.

As in Embodiment 1, the inside of the sterilizing unit chamber 5 is sterilized by a device of spraying, etc. the disinfectant such as hydrogen peroxide into the sterilizing unit chamber 5 before the operation.

The preform 1 on which the gas or mist of the disinfectant or the mixture of these were sprayed is passed to and received by the air spraying wheel 9 as shown in FIG. 6. As in Embodiment 1, the aseptic air is blown on the preform 1 that is passed to and received by the wheel 9.

After blowing the aseptic air, the preform 1 is passed to and received by the wheel 11 shown in FIG. 1. Here, the preform 1 is released from the gripper, the spindle 27 is inserted into the opening 1a of the preform 1 as shown in FIG. 2(A), and the preform 1 is conveyed to the heating unit 19 by the endless chain 12. As in Embodiment 1, the preform 1 conveyed to the heating unit 19 is heated to a temperature suitable for the subsequent blow molding.

As shown in FIG. 6, the heated preform 1 is released from the spindle 27, passed to and received by the gripper of the wheel 17, and conveyed to the molding wheel 47, while the aseptic air is blown by a preform aseptic air supply nozzle 46 from the opening 1a side. By blowing the aseptic air on the preform 1 after being heated, the preform 1 is supplied to the metal die 23 provided in the molding unit 21 of the aseptic blow molding machine 20 while maintaining the sterility.

The aseptic air blown on the heated preform 1 in the wheel 17 may be hot air. By blowing the aseptic hot air, a decrease in the temperature of the preform 1 is prevented.

Additionally, in a conveyance path in the wheel 17 for the preform 1 after being heated, a preform tunnel, which is not shown, may be provided so as to surround the conveyance path for the preform 1. The preform tunnel covers the opening 1a of the preform 1 from its upper side, and a ceiling part is formed in a roof shape having an inclined surface. Additionally, the preform aseptic air supply nozzle 46 that blows out the aseptic air toward the opening 1*a* of the preform 1 is provided in the ceiling part in pipe columns or in a slit shape. Accordingly, the aseptic air is efficiently supplied to the preform 1, and the preform 1 can be conveyed inside the heating unit chamber 18 while maintaining the sterility.

The inside of the heating unit chamber 18 is sterilized before the operation, and during the operation, the aseptic air is supplied, and the sterility of the preform 1 is maintained. The blowing of the aseptic air on the preform 1 in the wheel 17 is for improving the sterility, and may not be performed. At least the infrared heater 15, the reflector 16 that reflects the heat by the infrared heater 15 for efficiently heating the preform 1, the endless chain 12, the pulleys 13*a* and 13*b* that actuate the spindle 27 and the endless chain 12 are provided inside the heating unit chamber 18, and the driving unit 28, etc. that rotates the pulleys 13*a* and 13*b* is provided outside of the heating unit chamber 18. The inside of the heating unit chamber 18 is sterilized with the disinfectant such as hydrogen peroxide before the operation of the heating apparatus 14, and the sterility inside the heating unit chamber 18 is maintained by supplying the aseptic air into the heating unit chamber 18 at the time of the operation. In order to sterilize the inside of the heating unit chamber 18 with the disinfectant, a nozzle for spraying the disinfectant is provided in a wall surface of the heating unit chamber 18.

As shown in FIG. 2(B), the aseptic blow molding machine 20 that molds the preform 1 into the bottle 2 at least includes the molding unit 21 and the driving unit 48 as shown in FIG. 7.

As shown in FIG. 7, the molding unit 21 includes the mold 23, the blow nozzle 43, a valve block 45, and the extension rod 44. As shown in FIG. 2(B), the mold 23 consists of the split molds 23*a* and 23*b*, and the bottom mold 23*c*. In order to secure the sterility of the preform 1 and the bottle 2, the molding unit 21 must be sterilized before the operation, and the sterility must be maintained at the time of the operation. Although not shown, the driving unit 48 includes a motor, a hydraulic apparatus, an operation transmitting device, an air cylinder, etc. Since the equipment of the driving unit 48 requires a lubricant, and contamination is accumulated, it is difficult to maintain the sterility.

As shown in FIG. 7, in order to secure the sterility of the molding unit 21, the molding unit 21 is covered by the molding unit chamber 22. Since the inside of the molding unit chamber 22 is sterilized before the operation, the molding unit chamber 22 includes a sterilizing apparatus. Additionally, as shown in FIG. 7, the molding unit chamber 22 is formed by a movable unit 50 that holds the molding unit 21, and isolates the molding unit 21 from the driving unit 48, and a fixed unit 51 that covers the molding unit 21 from the outside. The movable unit 50 is rotated about a rotating pipe 52 as the central axis. The molding unit 21 held by the movable unit 50 is also rotated, and with the rotation, the preform 1 is molded into the bottle 2 as shown in FIG. 2(B).

By closing the split molds 23*a* and 23*b* and the bottom mold 23*c* of the mold 23, the preform 1 is passed to and received by the molding wheel 47 from the wheel 17. Thereafter, the blow nozzle 43 is joined to the opening 1*a* of the preform 1, the extension rod 44 is guided by the hole provided in the blow nozzle 43 to be inserted into the preform 1, and simultaneously, an intermediate pressure air P1 and a high pressure air P2 are sequentially sent into the preform 1 by the operation of the electromagnetic valve of the valve block 45, and the preform 1 is molded into the bottle 2. After the molding is completed, the extension rod 44 is lifted, and the high pressure air P2 remaining in the bottle 2 is returned to the intermediate pressure air P1 as a return air AR. The high pressure air P2 remaining in the bottle 2 may be exhausted to a non-aseptic atmosphere 53, without being returned as the intermediate pressure air P1. The mold 23 is opened, and the molded bottle 2 is gripped by the gripper of the wheel 24, and conveyed by a wheel outside the molding unit chamber 22. The molding of the preform 1 into the bottle 2 is performed by repeating the opening and closing of the mold 23 with the rotation of the movable unit 50 of the molding unit chamber 22 and the molding unit 21 held by the movable unit 50, the lowering and lifting of the extension rod 44, and the blowing of the intermediate pressure air P1 and the high pressure air P2 into the preform 1.

As shown in FIG. 7, the inside of the molding unit chamber 22 is maintained at an aseptic atmosphere at the time of the operation of the aseptic blow molding machine 20. The driving unit 48 is provided in the non-aseptic atmosphere 53. An aseptic atmosphere 54 and the non-aseptic atmosphere 53 are isolated by sealing the lower part of the movable unit 50 with a liquid seal apparatus 55 provided in the lower part of the movable unit 50. Although the liquid may be a liquid such as water, the liquid preferably includes a disinfectant, such as peracetic acid (as for the concentration included in the liquid, 100 ppm or more to 3000 ppm or less is preferable), or hydrogen peroxide (preferably included in the liquid for 1 mass % or more to 36 mass % or less). An end face of the movable unit 50 immersed in the liquid of the liquid seal apparatus 55 is provided so as not to contact a bottom part of the liquid seal apparatus 55. The liquid contacts both surfaces of the movable unit 50 that are immersed. However, when the inside of the molding unit chamber 22 is at a positive pressure by the supply of the aseptic air, the liquid surface height of the liquid on the side of the non-aseptic atmosphere 53 of the liquid seal apparatus 55 is higher than the liquid surface of the liquid on the side of the aseptic atmosphere 54. Additionally, in order to prevent the aseptic atmosphere 54 and the non-aseptic atmosphere 53 from communicating with each other when the liquid volume is decreased, a liquid level gage may be provided in the liquid seal apparatus 55 so as to constantly monitor the liquid surface. Additionally, when a large amount of the liquid flows into the liquid seal apparatus 55 and overflows from the liquid seal apparatus 55, the liquid flows into the aseptic atmosphere 54 of the blow molding machine 20. In order to prevent this, the wall surface height on the side of the non-aseptic atmosphere 53 of the liquid seal apparatus 55 may be made lower than the wall surface height on the side of the aseptic atmosphere 54, so that the overflowed liquid is stored in a liquid reservoir 56, and discharged from a bottom part of the liquid reservoir 56.

As shown in FIG. 7, the intermediate pressure air P1 and the high pressure air P2 required for molding the preform 1 into the bottle 2 are supplied by hoses that are provided inside the rotating pipe 52 from the upper part of the blow molding machine 20. The rotating pipe 52 and the fixed unit 50 are joined by a rotary joint 57, so as to enable the rotation of the rotating pipe 52. The intermediate pressure air P1 and the high pressure air P2 are introduced into a high pressure air supplying apparatus 58 in the non-aseptic atmosphere 53 from the hoses in the rotating pipe 52 that passes through the inside of the aseptic atmosphere 54. The air introduced into the high pressure air supplying apparatus 58 is sterilized with the aseptic filter. The high pressure air supplying apparatus 58 is rotatable, since the intermediate pressure air P1 and the high pressure air P2 are supplied to the valve block 45, which is held by the movable unit 50, from the high pressure air supplying apparatus 58.

The inside of the molding unit chamber 22 is sterilized before the operation of the aseptic blow molding machine 20. Therefore, as shown in FIG. 7, disinfectant nozzles 59 are provided in the fixed unit 50 of the molding unit chamber 22. The gas or mist of the disinfectant or the mixture of these is sprayed from the disinfectant nozzles 59 into the molding unit chamber 22. A sterilizing apparatus for spraying the gas or mist of the disinfectant or the mixture of these from the disinfectant nozzles 59 is provided in the aseptic blow molding machine 20.

The gas of the disinfectant generated by the disinfectant gas generator 39 shown in FIG. 4 is sprayed into the molding unit chamber 22 from the disinfectant nozzles 59. The disinfectant gas generator 39 and its operating condition are the same as those of Embodiment 1. Here, though the inside of the heating unit chamber 18 is maintained at a positive pressure by the aseptic air, the aseptic air heated by the infrared heater 15 of the heating unit 14, and exhausted from the heating unit chamber 18 may be used as an aseptic heated air to be blown into the conduit 42.

After spraying the gas or mist of the disinfectant or the mixture of these into the molding unit chamber 22 from the disinfectant nozzles 59, the aseptic air is blown into the molding unit chamber 22. The aseptic air vaporizes and removes the disinfectant remaining in the molding unit chamber 22. Additionally, on this occasion, the vaporizing disinfectant may also exhibit the sterilizing effect.

In order to blow the aseptic air into the molding unit chamber 22, as shown in FIG. 7, an aseptic air supplying apparatus 60 is provided on the fixed unit 51 of the molding unit chamber 22. The aseptic air supplying apparatus 60 includes a blower 61 and an aseptic filter 62. Additionally, it is preferable to provide an aseptic air heating apparatus 63 between the blower 61 and the aseptic filter 62, since there are also cases where the aseptic air is heated.

After the air from the blower 61 is heated by the aseptic air heating apparatus 63, and sterilized by the aseptic filter 62, the air becomes an aseptic hot air and is blown into the molding unit chamber 22. Although the aseptic air may not be heated, when heated, the removal of the disinfectant is quickly performed, and the sterilizing effect of the disinfectant is also increased. At this time, the heated aseptic air exhausted from the heating unit chamber 18 may be blown on the molding unit chamber 22.

In the sterilization before the operation of the aseptic blow molding machine 20, the inner surface side of the aseptic filter (HEPA) 62 is also sterilized by spraying the gas or mist of the disinfectant or the mixture of these by the disinfectant nozzles 59.

When supplying the aseptic air to the molding unit chamber 22 at the time of the operation of the aseptic blow molding machine 20 in order to maintain the sterility in the molding unit chamber 22, it is not always necessary to heat the aseptic air.

The aseptic air that passed through the aseptic filter 62 may be blown into the molding unit chamber 22, and may be exhausted by the exhaust apparatus provided in the molding unit chamber 22. Additionally, the aseptic air may flow into the heating unit chamber 18 from the molding unit chamber 22, and may be exhausted by the exhaust apparatus provided in the heating unit chamber 18.

The members exposed in the molding unit chamber 22 are sterilized by spraying the gas or mist of the disinfectant or the mixture of these into the molding unit chamber 22. However, there is a possibility that the passages for the intermediate pressure air P1, the high pressure air P2 and the return air AR of the blow nozzle 43 and the valve block 45, which are not exposed, are not sterilized. Therefore, the gas of the disinfectant generated by the disinfectant gas generator 39 may be introduced into these passages with the operation of molding, or a liquid disinfectant may be introduced to the inner surface of the preform 1 by a method of dropping, etc., the intermediate pressure P1 and the high pressure air P2 may be blown into the preform 1 from the blow nozzle 43 while the disinfectant remains on the inner surface of the preform 1, and the return air AR may be returned, so as to spread the disinfectant into the blow nozzle 43 or the valve block 45 to sterilize the passages.

The gap between the rotary joint 57 and the rotating pipe 52 is sterilized by spraying the gas or mist of the disinfectant or the mixture of these from the disinfectant nozzles 59 before the operation. Further, the disinfectant is removed by blowing the aseptic hot air, and an aseptic condition is maintained by blowing the aseptic air into the molding unit chamber 22 also at the time of the operation of the aseptic blow molding machine 20. Additionally, sterilization by steam may be concurrently used for sterilization before the operation.

Since the extension rod 44 and the mold 23 are exposed in the molding unit chamber 22, the extension rod 44 and the mold 23 are sterilized by the gas or mist of the disinfectant or the mixture of these sprayed from the disinfectant nozzles 59. As shown in FIG. 7, the extension rod 44 is held by an extension rod holding member 64. The operation of lifting and lowering the extension rod 44 is performed by operating the extension rod holding member 64. The extension rod holding member 64 is operated up and down by the movement of an extension rod holding member motion axis 64a. The extension rod holding member 64 is operated by rotating the extension rod holding member motion axes 64a by a servomotor provided in the driving unit 48, or by coupling the extension rod holding member motion axis 64a to a pneumatic cylinder. However, in the case of the pneumatic cylinder, it is necessary to sterilize the inside of the cylinder by introducing the gas of the disinfectant into the cylinder, etc., and to make the air for generating a pressure pass through an aseptic filter to sterilize the air. Additionally, the axis that goes in and out of the pneumatic cylinder may be protected with a bellows.

Since the gas or mist of the disinfectant or the mixture of these sprayed by the disinfectant nozzles 59 flows also into the gap between the extension rod 44 and the blow nozzle 43, the gap between the extension rod 44 and the blow nozzle 43 is sterilized.

Alternatively, the sterility of extension rod 44 may be maintained by surrounding the extension rod 44 that slides by a chamber, and supplying the gas or mist of the disinfectant or the mixture of these into the chamber. The disinfectant supplied into the chamber at the time of the operation may be exhausted from the upper part of the chamber, so that the disinfectant does not flow into the mold 23 or to the bottle 2 side. Additionally, when a disinfectant including hydrogen peroxide is used, the concentration of the hydrogen peroxide in the gas of the disinfectant is preferably 0.1 mg/L to 10 mg/L. In addition, according to the gas concentration of the disinfectant including hydrogen peroxide, in order to prevent the disinfectant from condensing on an inner surface of the chamber, a surface of the extension rod 44, etc., it is desirable to heat the gas of the disinfectant to the dew point of the gas of the disinfectant or higher.

As shown in FIG. 8, the extension rod 44 may not be directly held by the extension rod holding member 64, and may be lifted and lowered by using a magnetic body. The extension rod 44 coupled to an internal magnetic body 66 can also be lifted or lowered by providing an external magnetic body 65 via an external magnetic body holding member 67 that is coupled to an extension rod holding member motion axis 64a, and operating the external magnetic body 65. The external magnetic body 65 and the internal magnetic body 66 are isolated by an isolation pipe 68 made of a non-magnetic body, and the external magnetic body 65 slides on the outside of the isolation pipe 68, and the internal magnetic body 66 slides on the inside of isolation pipe 68. By moving the external magnetic body holding member 67, the external magnetic body 65 is operated up and down. FIG. 8(A) shows the state where the extension rod 44 is lifted, and FIG. 8(B) shows the state where the extension rod 44 is lowered, and inserted into the preform 1. The external magnetic body holding member 67 is operated by rotating the extension rod holding member motion axis 64a, or by coupling the extension rod holding member motion axis 64a to the pneumatic cylinder. Here, the upper part of the isolation pipe 68 is opened, and the extension rod 44 is sterilized by the gas or mist of the disinfectant or the mixture of these in the sterilization before the operation. Additionally, by providing a groove in the internal magnetic body 66 that contacts the isolation pipe 68, the gas or mist of the disinfectant or the mixture of these can flow into the lower part of the isolation pipe 68, and the lower part of the internal magnetic body 66 can also be sterilized.

The bottle 2 molded by the aseptic blow molding machine 20 of the present invention is conveyed to the inspection unit chamber via the wheel 24. The bottle 2 that is inspected in the inspection unit chamber, and determined to have not defect is conveyed to the filling unit chamber, filled with a sterilized contents, sealed with sterilized cap, and taken out to a non-aseptic atmosphere as an aseptic product. Although the inspection may not be performed, in the case where a foreign matter, discoloration, a crack, etc. of the body of the bottle 2, the top panel of the opening 1a, the support ring 1b, the bottom part, etc. are inspected, and when it is determined to exceed the limit, the bottle 2 is discharged.

Although the present invention is configured as described above, the present invention is not limited to the above-described embodiments, and various modifications can be made within the gist of the present invention. For example, the present invention is applicable to a linear type molding machine instead of the rotary molding machine. Additionally, a sterilizing unit that sterilizes the bottle 2 separately from the sterilization of the preform 1 after molding the preform 1 into the bottle 2 may be provided.

REFERENCE SIGNS LIST

1 . . . preform
2 . . . bottle
5 . . . sterilizing unit chamber
12 . . . endless chain
13a, 13b . . . pulley
14 . . . heating apparatus for preforms
15 . . . heater
16 . . . reflector
18 . . . heating unit chamber
19 . . . heating unit
20 . . . aseptic blow molding machine
21 . . . molding unit
22 . . . molding unit chamber
27 . . . spindle
28 . . . driving unit
30 . . . disinfectant nozzle
31 . . . aseptic air supplying apparatus
33 . . . aseptic air heating apparatus
39 . . . disinfectant gas generator
43 . . . blow nozzle
44 . . . extension rod
45 . . . valve block
50 . . . movable unit
51 . . . fixed unit
55 . . . liquid seal apparatus
58 . . . high pressure air supplying apparatus

The invention claimed is:

1. A heating apparatus for preforms, the heating apparatus comprising at least a heating unit that heats a preform to a temperature for blow molding of the preform into a bottle, and a driving unit that drives the heating unit,
   wherein the heating unit includes at least a heater, a reflector, a spindle, an endless chain, and a pulley for rotating the endless chain, the heating unit is covered by a heating unit chamber,
   a sterilizing apparatus that sterilizes an inside and an inner surface of the heating unit chamber is provided,
   a disinfectant nozzle that sprays the gas or mist of the disinfectant or the mixture of these in the heating unit chamber is provided as the sterilizing apparatus, and
   an aseptic air supplying apparatus is provided in the lower art of the heating unit chamber, the aseptic air supplying apparatus including a blower, an aseptic air heating apparatus and an aseptic filter in this order.

2. The heating apparatus for preforms according to claim 1,
   wherein the heating unit chamber holds the heating unit, and covers the heating unit from an outside air.

3. The heating apparatus for preforms according to claim 1, wherein the aseptic air heating apparatus is provided in the aseptic air supplying apparatus.

4. The heating apparatus for preforms according to claim 1, wherein a disinfectant gas generator that generates a gas of a disinfectant is provided in the sterilizing apparatus.

5. A heating method for preforms using a heating apparatus for preforms, the heating apparatus comprising at least a heating unit that heats a preform to a temperature for blow molding of the preform into a bottle, and a driving unit that drives the heating unit,
   wherein the heating unit includes at least a heater, a reflector, a spindle, an endless chain, and a pulley for rotating the endless chain, the heating unit is covered by a heating unit chamber, and a sterilized preform is heated by making the inside of the heating unit chamber into an aseptic atmosphere, and
   a gas or mist of a disinfectant or a mixture of these is sprayed into the heating unit chamber for making the inside of the heating unit chamber into an aseptic atmosphere while operating the heating unit.

6. The heating method for preforms according to claim 5, wherein an aseptic air is supplied into the heating unit chamber, and the inside of the heating unit chamber is held in the aseptic atmosphere.

7. An aseptic blow molding machine comprising at least a molding unit that performs blow molding of a preform into a bottle, and a driving unit that drives the molding unit,
   wherein the molding unit includes at least a mold, a blow nozzle, a valve block, and an extension rod, the molding unit is covered by a molding unit chamber, the molding unit chamber consists of a movable unit that holds the molding unit and covers the driving unit, and a fixed unit that covers the molding unit from an outside air, a sterilizing apparatus that sterilizes an inside and an inner surface of the molding unit chamber is provided, and a disinfectant nozzle that sprays a gas or mist of a disinfectant or the mixture of these into the molding unit chamber is provided in the sterilizing apparatus, and the disinfectant nozzle is provided in the fixed unit.

8. The aseptic blow molding machine according to claim 7, wherein a liquid seal apparatus that seals the movable unit and the fixed unit is provided.

9. The aseptic blow molding machine according to claim 7, wherein a high pressure air supplying apparatus is provided that is in the molding unit chamber, and that supplies a high pressure air to the valve block from an outside of the molding unit chamber through an inside of a rotating tube.

10. The aseptic blow molding machine according to claim 7, wherein an aseptic air supplying apparatus that supplies an aseptic air to the molding unit chamber is provided.

11. The aseptic blow molding machine according to claim 10, wherein the aseptic air supplying apparatus is provided on the molding unit chamber.

12. The aseptic blow molding machine according to claim 10, wherein an aseptic air heating apparatus is provided in the aseptic air supplying apparatus.

13. The aseptic blow molding machine according to claim 7, wherein a disinfectant gas generator that generates a gas of a disinfectant is provided in the sterilizing apparatus.

14. An aseptic blow molding method using an aseptic blow molding machine comprising at least a molding unit that performs blow molding of a preform into a bottle, and a driving unit that drives the molding unit, wherein the molding unit includes at least a mold, a blow nozzle, a valve block, and an extension rod, the molding unit is covered by a molding unit chamber consisting of a movable unit that holds the molding unit and covers the driving unit, and a fixed unit that covers the molding unit from an outside air, an inside of the molding unit chamber is sterilized before an operation of the aseptic blow molding machine by spraying a gas or mist of a disinfectant or a mixture of these from a disinfectant nozzle provided in the fixed unit, and a sterilized preform is molded into the bottle by making the inside of the molding unit chamber into an aseptic atmosphere.

15. The aseptic blow molding method according to claim 14, wherein the molding unit chamber is sterilized by spraying a gas or mist of a disinfectant or a mixture of these into the molding unit chamber.

16. The aseptic blow molding method according to claim 14, wherein an aseptic air is supplied into the molding unit chamber, and the inside of the molding unit chamber is maintained in the aseptic atmosphere.

* * * * *